(12) United States Patent
Logan (10) Patent No.: US 7,809,368 B2
(45) Date of Patent: Oct. 5, 2010

(54) ARCHITECTURE FOR LOCATION INDEPENDENT, AUTOMATED INTEGRATION TESTING AND QUALITY ASSURANCE OF NEXT GENERATION IMS SERVICES

(75) Inventor: Ian Logan, Chippenham (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 891 days.

(21) Appl. No.: 11/423,275

(22) Filed: Jun. 9, 2006

(65) Prior Publication Data

US 2007/0287445 A1    Dec. 13, 2007

(51) Int. Cl.
H04W 24/00    (2009.01)
(52) U.S. Cl. .................... 455/423; 455/67.11
(58) Field of Classification Search ............. 455/423, 455/425, 67.11
See application file for complete search history.

(56) References Cited

U.S. PATENT DOCUMENTS

| 5,771,276 | A | 6/1998 | Wolf |
| 6,014,428 | A | 1/2000 | Wolf |
| 6,957,420 | B2 | 10/2005 | Hand, Jr. et al. |
| 7,206,548 | B1 * | 4/2007 | Sumler et al. ............ 455/67.11 |
| 2002/0155816 | A1 * | 10/2002 | Fodor et al. ................ 455/67.1 |
| 2003/0023755 | A1 * | 1/2003 | Harris et al. ................ 709/246 |

OTHER PUBLICATIONS

SIGOS IVR Test System—Product Sheet, SIGOS Systemintegration GmbH, KlingenhofstraBe 50d D 90411 Nurngerg. Available at /www.sigos.de/en/site.html on Aug. 30, 2002.

* cited by examiner

Primary Examiner—Nick Corsaro
Assistant Examiner—Vladimir Magloire
(74) Attorney, Agent, or Firm—Wall & Tong, LLP (57) ABSTRACT

A tool is provided that allows engineers to perform call-based, network, and scenario testing at a customer site from a remote location. This tool not only improves the accuracy of testing, but also nearly eliminates the need for mobility engineers to spend time and money traveling to customer sites.

20 Claims, 7 Drawing Sheets

ARCHITECTURE FOR LOCATION INDEPENDENT, AUTOMATED INTEGRATION TESTING AND QUALITY ASSURANCE OF NEXT GENERATION IMS SERVICES

FIELD OF THE INVENTION

The present invention generally relates to next generation networks and automated testing and, in particular, relates to an architecture for location independent, automated integration testing and quality assurance of next generation IP multimedia subsystem (IMS) services.

BACKGROUND OF THE INVENTION

Telephony services have encountered great success over the past decade based on the provision of voice and data related services delivered over a traditional circuit switched network. The evolution of services within those networks can create a situation where the provision of a new service involves the introduction of a new network element providing only that specific functionality. Hence, associated functional and quality assurance testing associated with a specific service is targeted only at the element providing the functionality. Existing testing typically deals with very specific mechanisms related to the specific function, specific purpose, specific operation, and specific behavior of a specific network element. For example, an existing system may refer specifically to a network element (e.g., interactive voice response (IVR) or detail a method specific to an application. Furthermore, existing systems have provisions only for traditional circuit switched networks and architectures.

As the industry evolves towards next generation networks, network owners will derive benefit from their networks, while opening these networks to third parties to develop and offer enhanced and tailored services and applications of their own. The traditional architecture and methodologies will be affected. Next generation IP Multi-Media Subsystem (IMS) is an IP multimedia and telephony core network that is defined by the 3rd Generation Partnership Project (3GPP) and 3GPP2 standards and organizations based on Internet Engineering Task Force (IETF) Internet protocols, which define how communications technologies can work together to deliver new services to enrich communications for end-users. IMS is an access independent, standardized reference architecture that includes session and connection control and an applications services framework along with subscriber and services data. IMS enables new converged voice and data services, while allowing for the interoperability of these converged services between subscribers.

No existing work can deliver a common automation and quality assurance test methodology that will bridge this (and future) technology migrations, while providing full independence from all levels of implementation detail.

SUMMARY

Exemplary embodiments of the present invention provide systems and methods for location independent, automated integration testing and quality assurance of next generation IMS services.

One embodiment is a system for testing including a platform, a server, and one or more clients. A platform receives different types of mobile phones. The platform includes a number of dynamic configurations for adapting testing to the types of mobile phones. The server provides an automated testing service that has general commands adapted to the types of mobile phones by the platform. The client uses the general commands of the automated testing service via a network (e.g., an intelligent network) to stimulate one or more mobile phones. The system may also include an application independent stimulus and response rules language. The language may be used to create a set of abstract stimulus actions and a set of abstract response actions for expected results of the stimulus actions. The automated testing service may be stimulus-response testing or black box testing. The system may also include a service authoring environment.

Another embodiment is a method for testing. The platform receives different types of mobile phones and adapts testing to the types of mobile phones using dynamic configurations. The server provides an automated testing service via a network to stimulate at least one mobile phone. The automated testing service has general commands adapted to the types of mobile phones. Another embodiment is a computer-readable medium storing instructions for performing this method of testing.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The description of the present invention is primarily within a general context of location independent, automated integration testing and quality assurance of next generation IMS services. However, those skilled in the art and informed by the teachings herein will realize that the invention is generally applicable to other networks and standards, past and future, and may be applied in many industries, such as telephony, communications, networking, and other industries that perform testing of communications networks. Accordingly, the general concepts of the present invention are broadly applicable and are not limited to any particular described system or method.

Introduction

Success for network carriers in the highly competitive telecommunications market centers on the ability to deploy a continuous stream of new and different value-added services quickly and economically. It is desirable for a service platform to provide a dynamic combination of speed, performance, and capacity with reliability, availability, flexibility, and scalability. The MiLife Application Server (MAS) is a new generation, intelligent database server that delivers a range of services in the wireline, wireless, and data markets. It processes the service logic and holds subscriber data for services, such as super distributed home location register, authentication center, SurePay (i.e., prepaid and postpaid, voice and data charging to wireline, wireless and IMS networks), short message service center, virtual private network, calling name, and over-the-air activation.

Accelerating Service Design and Development

Speed-to-market is essential in today's communications industry. A platform needs to facilitate the speedy introduction of new services. MAS is a programmable platform that provides large database capabilities for multiple revenue generating and cost saving services. The service logic and subscriber data are centralized, rather than dispersed and replicated in all switching exchanges or mobile switching centers. This brings not only cost savings, but also enables the introduction of new value-added services quickly and easily to market. For further network efficiency, the MAS can support software for multiple services operating on the same system. In addition, to address new opportunities and competitive positioning, unique services can be customized or developed for the MAS using an optional enhanced service authoring environment (eSAE), allowing the customer to develop his own services.

Flexibility for Changing Market Needs

The MAS scalable platform design and portable software architecture helps to smoothly evolve a system from small to large as needs change by facilitating rapid expansion of a service subscriber base and increased demand for advanced services and allowing both wireless and wireline integration on the same MAS.

Live Network Introduction

Service design and development form only part of the process for rolling out new revenue generating services to end-users. Arguably, the most critical parts of the lifecycle are the integration/functionality testing and quality assurance activities, because failure to execute these intervals effectively may result in dissatisfied, non-revenue generating end users that service providers want to avoid. Consequently, the execution of the testing and quality assurance for a new service can become a lengthy, involved, and error-prone process. Testing methods are often manual in nature and ensuring a quality product under these circumstances results in extended time-to-market and increasing costs, which is the very opposite of what every service provider desires.

Accelerating Time-to-Revenue, Reducing Costs, Ensuring Quality

Exemplary embodiments of the testing system enable a service provider to reduce testing intervals while ensuring full regression quality of various aspects of service deliveries. The testing system provides the ability to test various scenarios remotely from a mobile handset to satisfy a variety of network scenarios. The ability to automate the process of call generation, specify MAS response criteria, and continue with further stimulus actions enables the testing system to satisfy criteria for numerous functional aspects of a service. This allows a service provider to retain a library of automated functional tests that may be scheduled at their convenience, taking advantage of 24/7-system availability without the need for extensive human interaction. This approach ensures reduced delivery time and cost, without sacrificing quality, resulting in accelerated time-to-market and revenue generation.

Definition of Terms

A network operator is the company that is responsible for the telephony network planning and maintenance.

A service provider is the organization that commercially manages services offered to end-users, making use of the network infrastructure provided by the network operator.

A content provider is an organization that offers web-based content, such as stock quotes and news articles to end-users.

A subscriber is a person or organization that subscribes to the service. For example, an individual subscriber may subscribe to the SurePay prepaid service and to the e-commerce gateway service to pay for downloading content through the wireless application protocol (WAP) gateway.

A subscriber ID is the SurePay end-user. The phone number is assigned to a prepaid end user that uniquely identifies the subscriber. In a global system for mobile communications (GSM) network, this is equivalent to the end users mobile station international subscriber directory number (MSISDN) or subscriber identity module (SIM) card. In an ANSI-41 time division multiple access/code division multiple access (TDMA/CDMA) network, this is equivalent to the end users mobile directory number (MDN) or mobile identification number (MIN).

An end user is the person using the SurePay or e-commerce gateway service generating a call or similar activity on the network. An end user may be either prepaid or postpaid.

A prepaid end user is a person using the service who paid up front for the service.

A postpaid end user is a person using the service who is charged for the service later.

It should be noted that network operator, service provider, and content provider might be the same organization in some markets.

System Overview

With the ever-increasing competitiveness within the mobile sector between service providers and with the dramatic increase in the range of possible services that can be offered through the phone, one of the battlegrounds between service providers for revenue generation and growth is time-to-market. Exemplary embodiments of a testing system offer mechanisms for automated test execution of network service functionality, which is a key component for reducing time-to-market without sacrificing quality.

Network Overview

Figure 1:
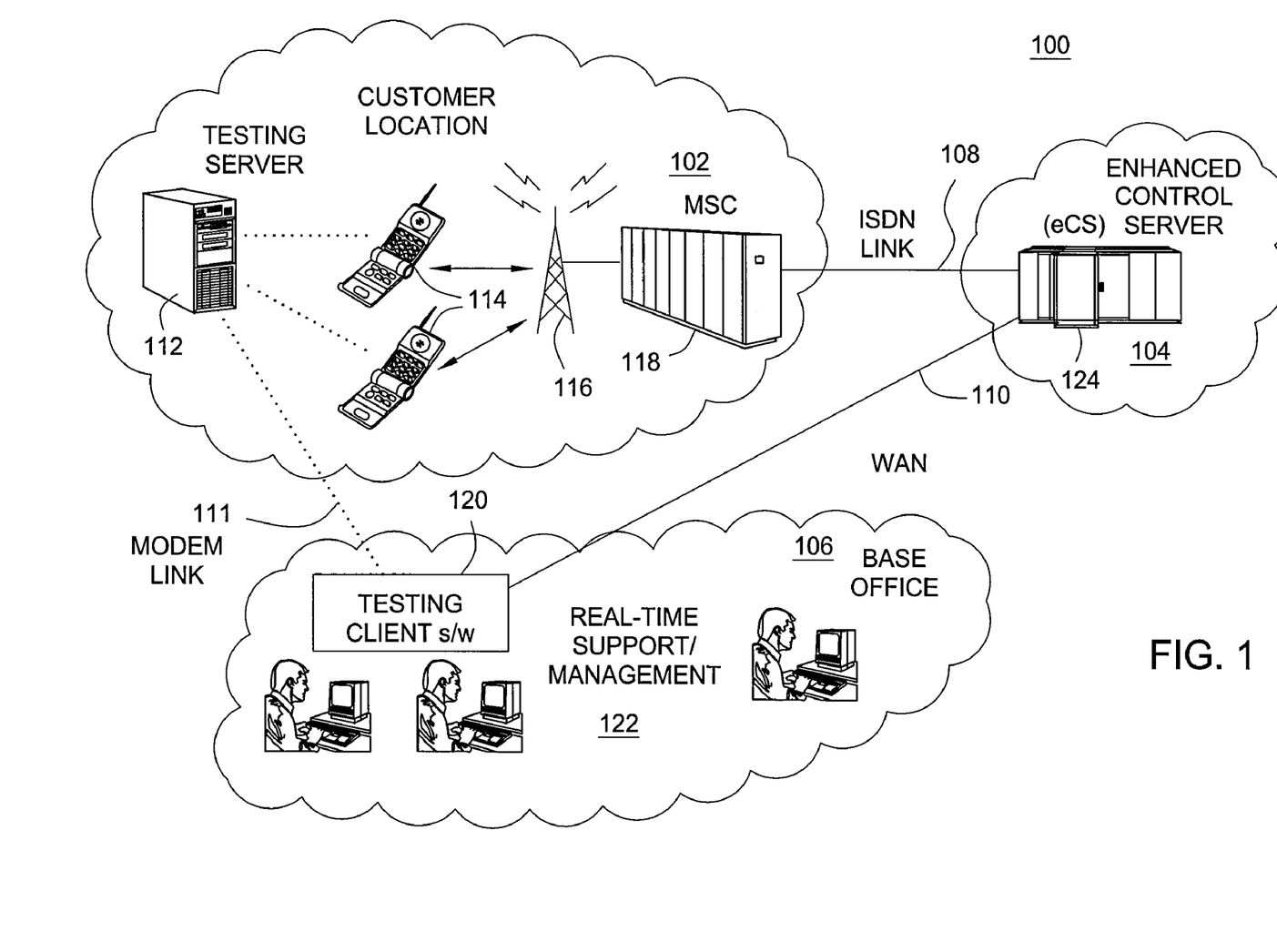
FIG. 1 shows an overview of an exemplary embodiment of a testing system.

FIG. 1 shows an overview of an exemplary embodiment of a testing system 100 illustrating how the testing system 100 is location independent. In this example, a customer 102, a control server 104 (e.g., enhanced control server (eCS)), and a base office 106 are in three different locations. At the customer location 102, the testing server 112 connects to a number of mobile phones 114 to be tested. The mobile phones 114 communicate with a mobile station 116, which communicates with a mobile switching center (MSC) 118. The MSC communicates via a link 108 (e.g., integrated services digital network (ISDN) link) with the eCS 104. The eCS 104 communicates over a network 110 with the base office 106. At the base office 106, there is real-time support or management 122 and testing client software 120, which executes testing scripts to stimulate the mobile phones 114 at the customer location. The testing client software 120 communicates with the testing server 112 at the customer location via a modem link 111. The present invention is not limited to any particular system or configuration and FIG. 1 illustrates only one example of a location-independent testing system.

Figure 2:
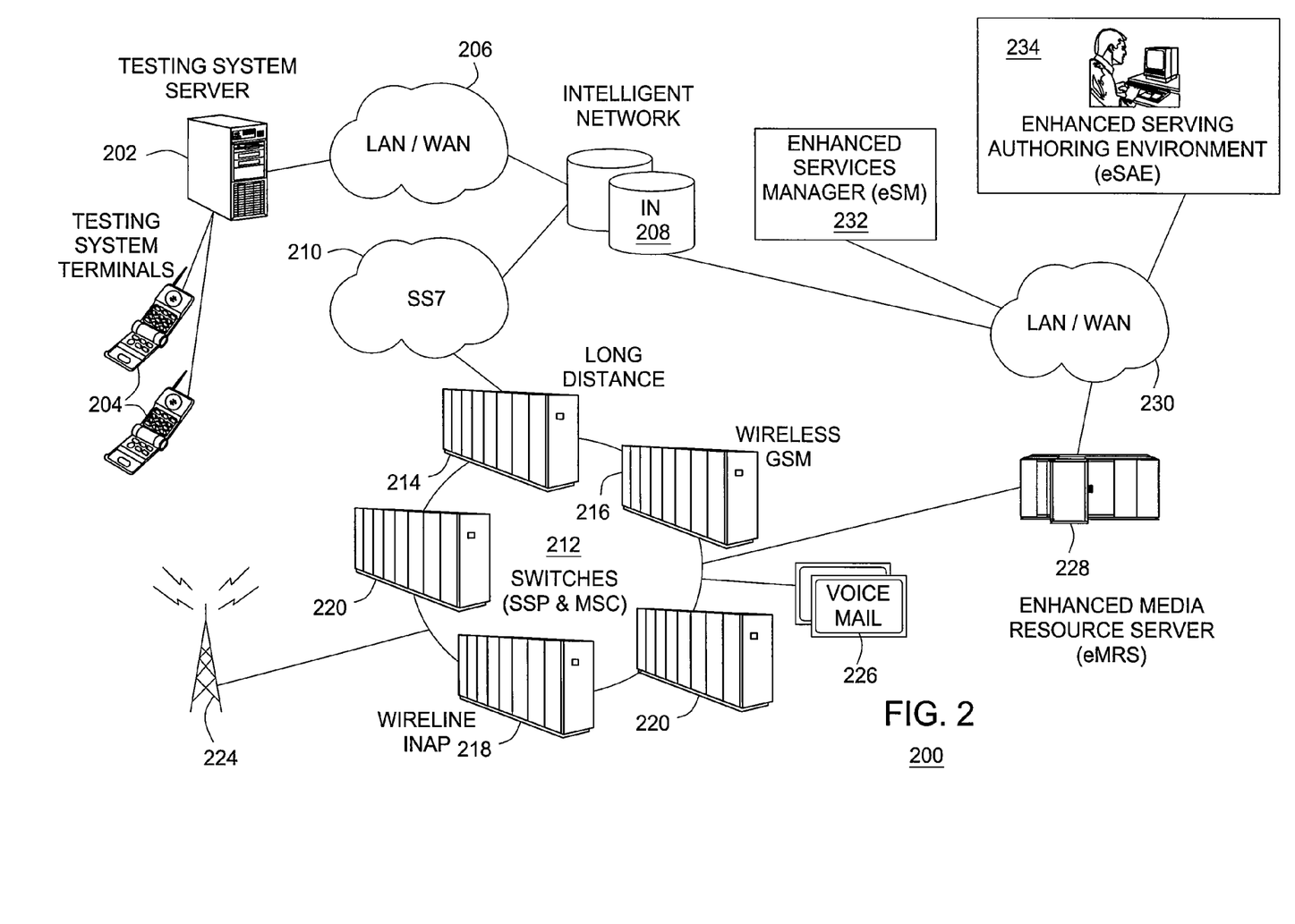
FIG. 2 is a block diagram showing system architecture of an exemplary operating environment in which an exemplary embodiment of a testing system may operate.

FIG. 2 shows the system architecture of an exemplary operating environment 200 in which an exemplary embodiment of a testing system, which includes a server 202 and terminals 204 may operate. However, the present invention is not limited to any particular operating environment and specific components may be changed or omitted or other components may be included. In this example, the testing system 202 communicates via network 206 with an intelligent network (IN) that delivers a range of wireline, wireless, and data services, such as MAS 208. The MAS 208 communicates with a telecoms network 212 using the communications protocol signaling system seven (SS7) protocol suite.

Telecoms network 212 is an infrastructure for handling mobile phone calls. The telecoms network 212 includes a service switching point (SSP), an MSC, a wireless a GSM, a wireline intelligent network application part (INAP), and other components 220, including a voice mail server 226. The SSP is a node in the SS7 that includes the call processing logic. The MSC is a sophisticated telephone exchange that provides circuit-switched calling, mobility management and GSM services to mobile phones. INAP is a signaling protocol used in the IN architecture. INAP is part of the SS7 protocol suite, typically layered on top of the TCAP protocol.

In addition, the operating environment 200 includes an enhanced services manager (eSM) 232 and eSAE 234, which operators use to design and create telecom services. When new services are created to allow users to make phone calls in different ways (e.g., a prepaid application, a 911 application, or other types of applications), these services may be tested using the testing system 202. A network 230 connects the eSAE and eSM to the MAS and an enhanced media resource server (eMRS). The eMRS is a platform for providing new services and adding subscribers and it supports both telephony and Internet protocols.

Figure 3:
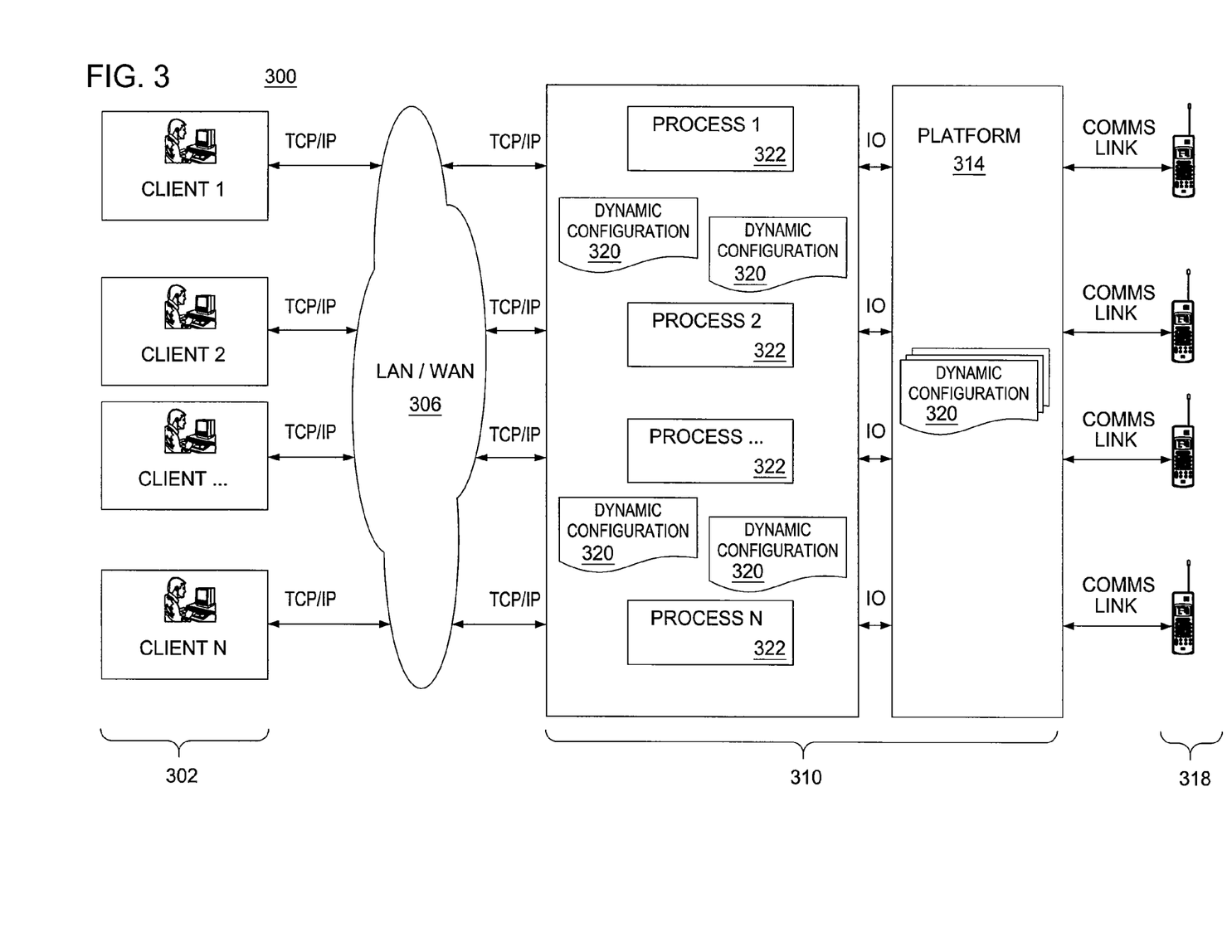
FIG. 3 is a block diagram showing software architecture of an exemplary embodiment of a testing system.

FIG. 3 shows the software architecture of an exemplary embodiment of a testing system 300. The testing system 300 includes a number of clients 302, a server 310, which includes a number of processes 322, a number of dynamic configurations 322, and a testing platform 314. The clients communicate using a protocol, such as transaction control protocol/Internet protocol (TCP/IP) 304 over a network 306 with the server 310, which, in turn, communicates with the testing platform 314. The mobile phones 318 communicate over links with the testing platform 314.

Any type of mobile phone 318 can be plugged into the platform 314 of the server 310. For example, it does not matter whether the mobile phone 318 is an old phone that makes calls or sends short messages or a new phone that browses the web. Nor does it matter whether the mobile phone is a GSM phone or a CDMA phone. The client 302 can stimulate any kind of mobile phone 318 using the testing system 300. The client 302 may execute scripts, for example, to stimulate the mobile phone 318 without concern for differences between the mobile phones 318. Any command in the scripts (e.g., dial) is translated by the server 310 using the dynamic configurations 320 into the appropriate command for any particular type of mobile phone 318 in any particular environment. The dynamic configurations 320 are files stored on the server 310 that configure the processes 322. Each dynamic configuration 320 is for a different kind of mobile phone 318 and/or environment.

One exemplary embodiment of the testing system includes distinct architectural separation, allowing complete independence between the following: end user trigger (i.e., start of the call), end user location (e.g., U.K, U.S.), transmission interface and manufacturer (e.g., GSM or CDMA network), transport infrastructure and manufacturer, application(s) path under test, success criteria, among other things. Architectural separation means that the testing system abstracts away from the specific testing context, unlike prior testing systems. Prior testing systems were application specific; they tested a particular service with a specific phone in a specific context in a specific way. Any phone may be stimulated in a general way by the testing system without regard to the specifics. For example, a tester in the U.K. may make test calls to Germany, America, or New Zealand, saving the time and cost of travel. Any application (e.g., IVR system) may be tested in a general way as well.

This exemplary embodiment of the testing system includes the following additional features: an application independent stimulus and response rules language, an editor for creating and updating rules, a real-time rules execution process, a method for creating a set of abstract stimulus actions to specify what deterministic actions are executed, a method of creating a set of abstract response actions that dictate the expected result(s) of a stimulus, a method of creating a set of abstract response actions that dictate the expected side effects of a stimulus, and a rule set that allows independent stimulus-response and/or black box automation methodologies to be employed.

The design is separated at key architectural points: the terminal layer, the platform layer, the server layer, the deterministic response layer, and the client layer. The terminal layer allows for any type, manufacturer, model, or terminal to be physically connected to the platform. Hence, disassociation from the actual transport interface is achieved and the same operations can be performed regardless of how the call or event is transported over the air (GSM/CDMA etc.) or by another transport mechanism (IP, WiFi, etc.). The platform layer provides separation of end user interface and terminal capability, translating end user commands into associated terminal actions. Hence, the same end user command would result in the same terminal behavior regardless of type, manufacturer, or model. The server layer provides a common or standardized set of end user operation slowing the end user to stimulate a given action from a terminal and/or an external network element, without knowing the nature of the terminal or network element. The deterministic response layer provides a mechanism for concerned network elements involved in the processing of the call or event to broadcast details regarding the processing of the call or event. The client layer integrates the server and response layer into a single, logical, location independent function allowing end users to specify stimulus and response criteria for any given application regardless of the user's geographical location.

Application Independent Stimulus and Response Rules Language

One exemplary embodiment includes an application-independent stimulus and response rules language. Any individual handset, terminal, action, or event may have zero, one, or more responses to a particular stimulus. Stimulus would result in associated responses, which may come from a variety of different sources, such as the handset/terminal itself, the network, or any one of the interconnecting elements. Hence, it is possible for the success or failure of a single call/event to be determined by analyzing he associated responses from each concerned network element involved in processing the call/event.

Each concerned network element can be activated by configuration data within the application and, therefore, different types of calls/events can be configured with different sets of active response criteria. Furthermore, it is possible to flexibly define additional criteria that will be applied to decide if the call/event has had the desired effect on the network. For example, a call/event by a subscriber will always resulting the exchange of signaling messages; however, it may also result in the modification of network element specific data only accessible by querying the network element itself (i.e., the balance of a subscriber's account).

Real-Time Rules Execution Process

For one exemplary embodiment, at each active stimulus point, the application will interpret the associated response criteria containing a set of input name/value pairs (NVPs). Note that the NVP are associated with (any of) the concerned network elements responsible for processing the call/event so the combination of NVP data that is used to determine the success or failure can also be flexibly configured within the application.

Creation of a Set of Abstract Stimulus Actions that can Specify What Deterministic Actions are Executed For one exemplary embodiment, a common set of stimulus actions is provided to allow the user to direct the function of a handset/terminal and/or external network elements (such as provisioning systems). This functionality enables any application to be "driven" by a combination of stimulus.

Creation of a Set of Abstract Response Actions that Dictate the Expected Side Effects of a Stimulus Application Data For one exemplary embodiment, it is also possible for the provider to define new data that can be passed to the rules engine as inputs for determining the success/failure.

A Rule Set that Allows Independent Stimulus-Response and/or Black Box Automation Methodologies to be Employed For one exemplary embodiment, the flexibility with which the stimulus and response actions can be applied, allows for the tailoring of testing methodologies for the most appropriate architectures. For example, for a standard voice call to a specific destination, success can be determined by any one (or combination) of the following criteria: terminal level (call is answered and completed), network/signaling level (call is processed according to standard protocols defined for the associated network), application data level (call results in subscribers balance decreasing by a specified amount for specified call duration), and any combination of the above criteria.

Any variable defined within the application logic can be a candidate for a rule set input NVP. The input data is used by the rule set to make decisions about the subsequent success or failure determination for the call or event. If a stimulus-response mechanism was necessary to determine success or failure, the terminal level or network/signaling level methods could be employed. If a black box methodology were necessary, the application data level method could be employed. Alternatively, exemplary embodiments of this invention provide the ability to combine either approach.

In addition to determining the direct results of a stimulus, side effects often occur (such as subscriber data changes). These side effects of execution can take place on network elements that do not directly signal that such changes have taken place. Therefore, one exemplary embodiment of this invention enables asynchronous interrogation of external elements using the NVPs concept to specify that one or more actions shall be executed by the application on receipt of the response.

Example Call Flows

Figure 4:
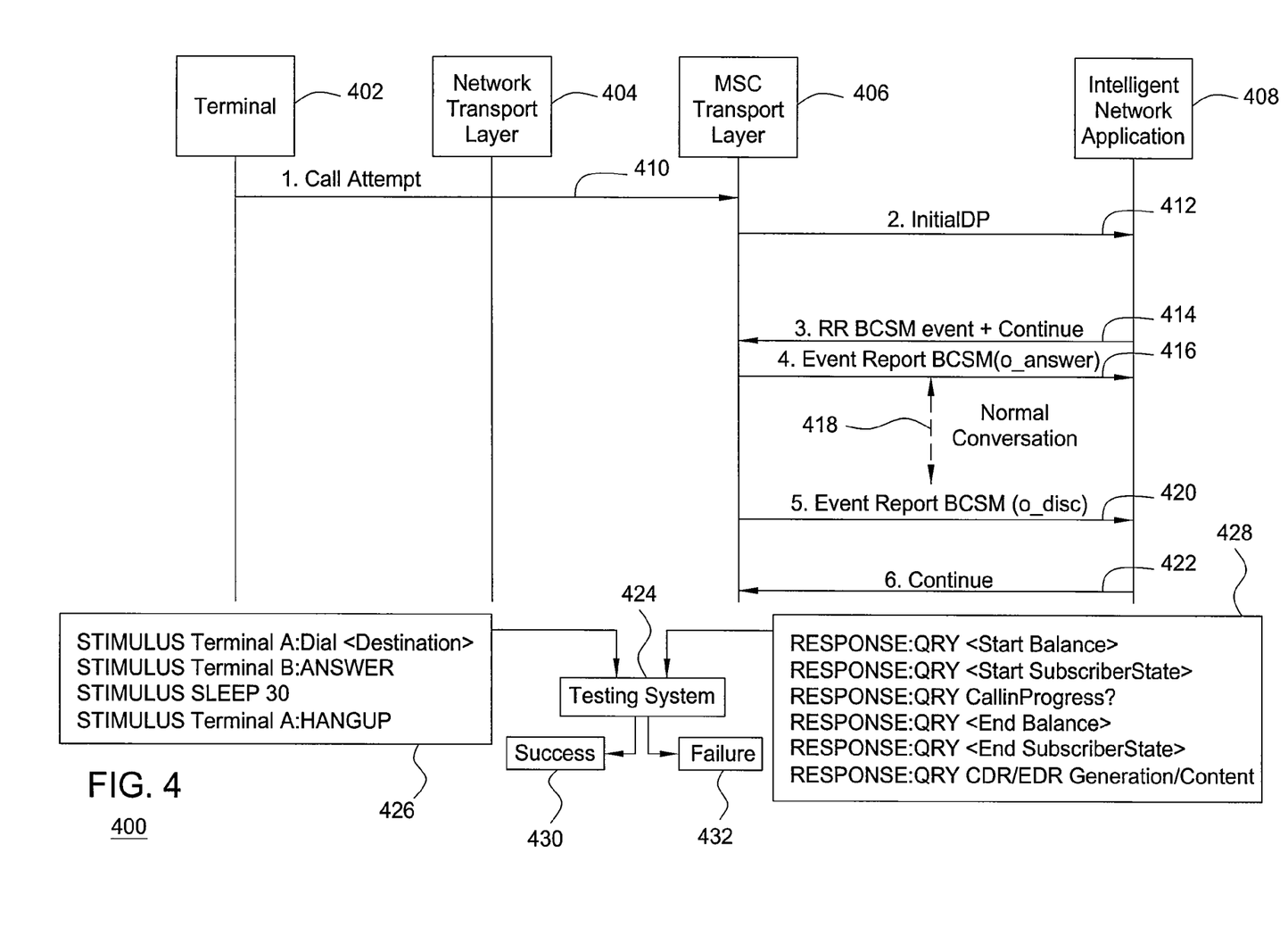
FIG. 4 is a block diagram illustrating an example call flow tested from a black-box perspective.

FIG. 4 illustrates an example call flow 400 for a mobile originated European Telecommunications Standards Institute Capability Set 1 (ETSI-CS1) call. A terminal 402, a network transport layer 404, an MSC transport layer 406, and an IN application 408 participate in the call flow 400. In this example, the testing system is used to verify the flow of a prepaid IN call scenario from a black-box perspective. This scenario can be managed through the testing system independent of the network technology and terminal (IMS vs. IN, GSM vs. CDMA, handset vs. personal digital assistant (PDA), etc.). An exemplary method of testing for the example call flow of FIG. 4 is as follows.

1. The testing system 424 interrogates the IN 408 for the terminal A/B profile data and the pre-test state.
2. The testing system 424 stimulates terminal A to make a call to terminal B at 410.
3. The MSC 406 sends an initialDP start event to the IN 408 for an outgoing call at 412.
4. The IN 408 allows call to continue at 414.
5. The testing system 424 monitors terminal B alerts and stimulates terminal B to answer.
6. The originating MSC 406 sends an oAnswer event to the IN 408 at 416. (The IN 408 begins timing the call at this point for rating purposes.)
7. The testing system 424 interrogates the IN 408 for terminal A/B profile data and the in-call state.
8. The testing system 424 waits for 30 seconds.
9. The testing system 424 stimulates terminal A to end the call.
10. The IN 408 is notified by an oDisconnect event and completes the call at 420, 422
11. The testing system 424 interrogates the IN 408 for the terminal A/B profile data and the post-test state.
12. The testing system 424 determines the scenario success 430 or failure 432.

The testing system 424 processes the stimulus information 426 and response information 428 to determine whether the test was a success 430 or a failure 432. For example, if the balance did not go down a dollar because the call duration was a minute, then the test failed, i.e., the charge was the wrong amount. If, for example, the balance did not go down at all, then the call did not go through and the test failed.

The testing system 424 includes plug-ins for checking a database, log, or application under test to determine information about the subscriber (e.g., post-test state, call data record (CDR), event data record (EDR)) using the rules language and the information in the dynamic configuration files.

Figure 5:
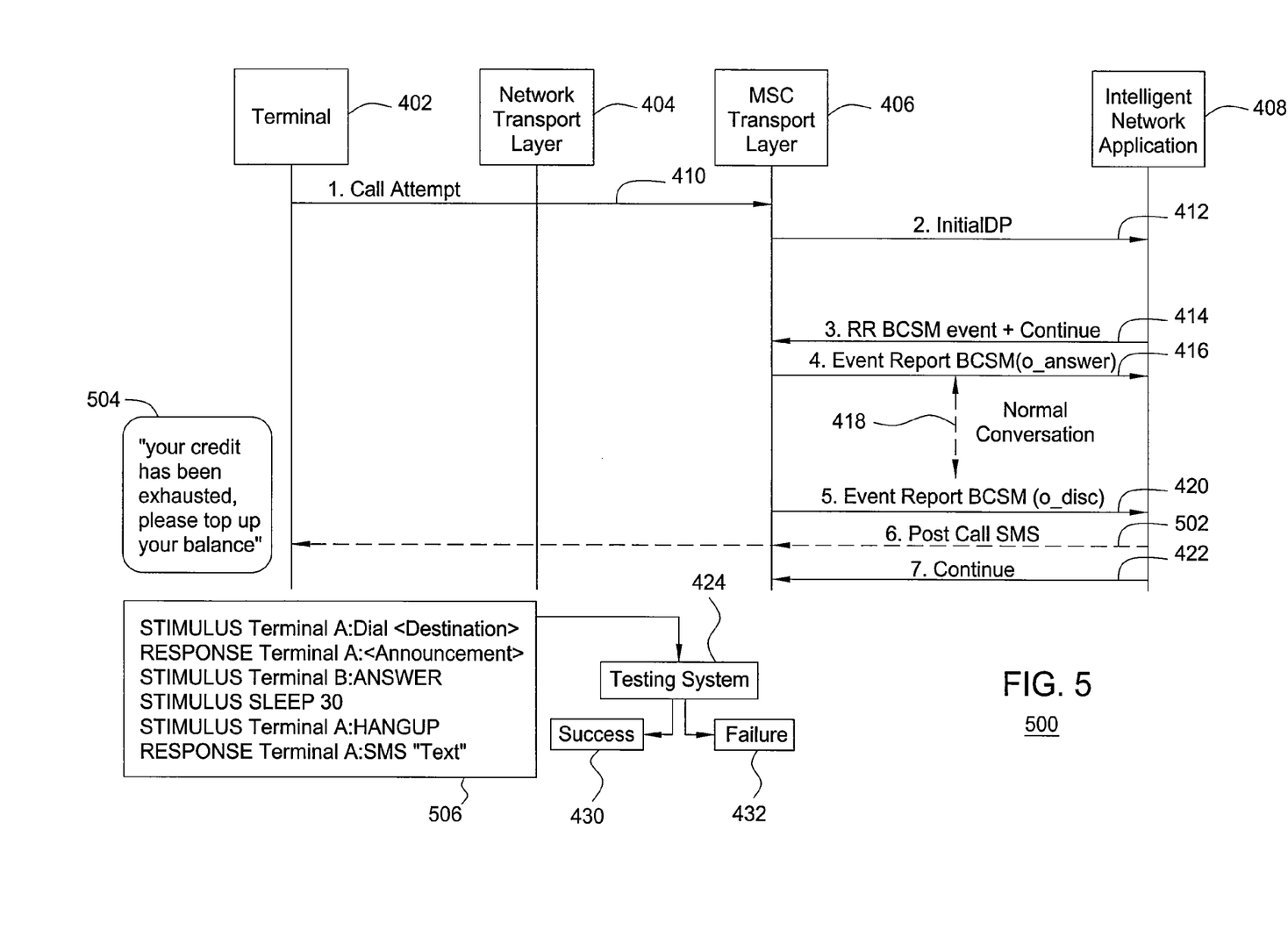
FIG. 5 is a block diagram illustrating an example call flow for a call with a short message tested from the end user perspective.

FIG. 5 illustrates an example call flow 500 for a mobile originated ETSI-CS 1 call with a short message. In this example, the testing system 424 is used to verify the flow of a prepaid IN call scenario from the end user perspective. This scenario can be managed through the testing system 424 independent of the network technology (IMS vs. IN, GSM, CDMA, etc.). An exemplary method of testing for the example call flow of FIG. 5 is as follows.

1. The testing system 424 stimulates terminal A to make a call to terminal B at 410.
2. The MSC 406 sends the InitialDP start event to the IN 408 for an outgoing call at 412.
3. The testing system 424 monitors terminal A.
4. The IN 408 allows the call to continue at 414.
5. The testing system 424 monitors terminal B alerts and stimulates terminal B to answer.
6. The originating MSC 406 sends an oAnswer event to the IN 408 at 416. (IN 408 begins timing the call at this point for rating purposes.)
7. The testing system 424 waits for 30 seconds.
8. The testing system 424 stimulates terminal A to end the call.
9. The IN 408 is notified with oDisconnect event 420.
10. The IN sends a short message to terminal A at 502.

11. The testing system 424 monitors terminal A for short message and its contents.
12. The testing system 424 determines scenario success/failure.

Figure 6:
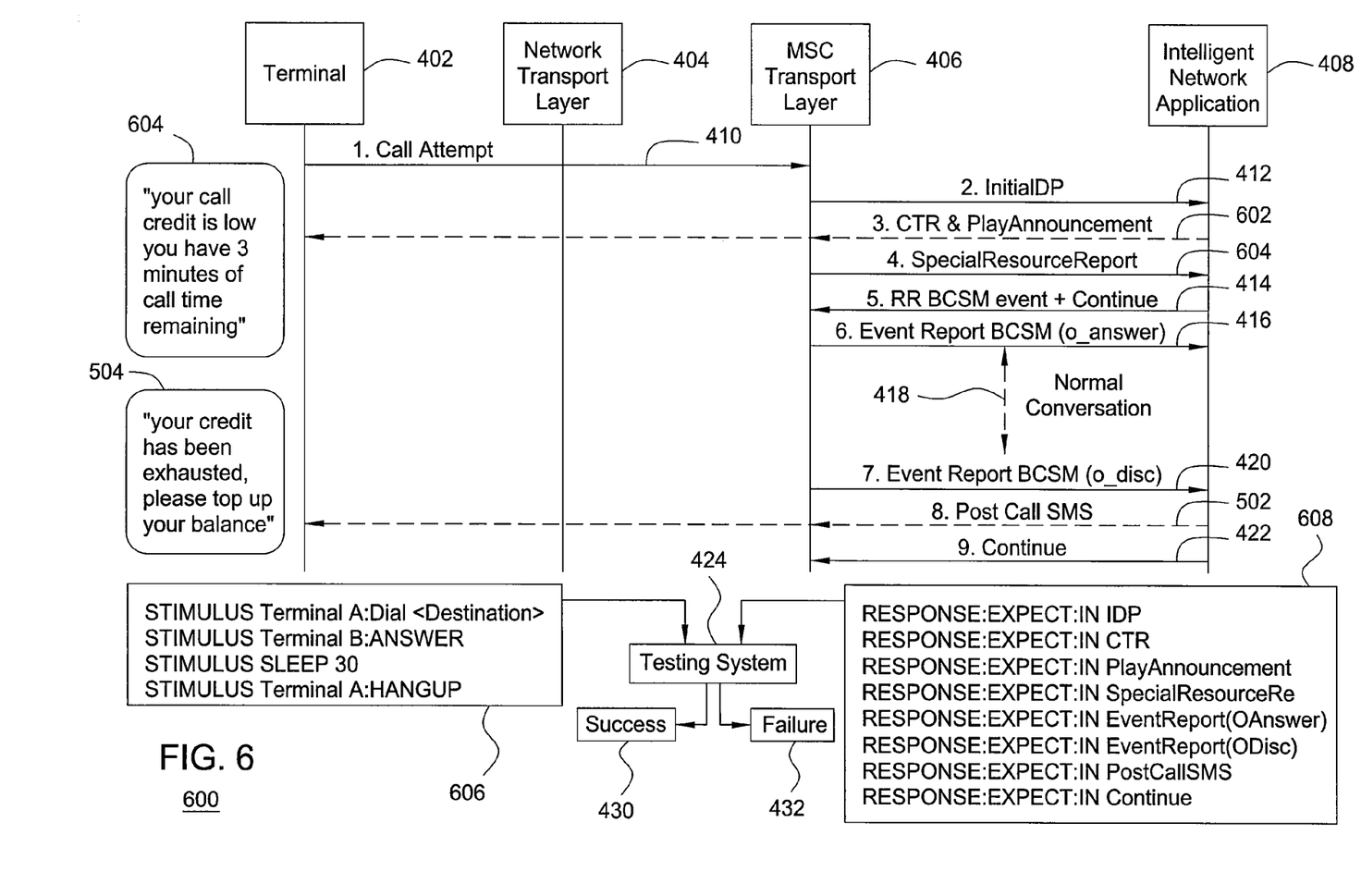
FIG. 6 is a block diagram illustrating an example call flow for a call with an announcement and a short message tested from the network perspective.

FIG. 6 illustrates an example call flow 600 for a mobile originated ETSI-CS call with an announcement and a short message. In this example, the testing system 424 is used to verify the signaling flow of a prepaid IN call scenario from the IN perspective. This scenario can be managed through the testing system 424 independent of the network transport. An exemplary method of testing for the example call flow of FIG. 6 is as follows.

1. The testing system 424 stimulates terminal A to make a call to terminal B at 410.
2. The MSC 406 sends an InitialDP start event to the IN 408 for an outgoing call at 412.
3. The testing system 424 monitors the IN 408 for the arrival of the InitialDP event.
4. The IN 408 plays an announcement to terminal A at 603, 604.
5. The testing system 424 monitors the IN 408 for signaling pertinent to the start and end of the announcement.
6. The IN 408 allows call to continue at 414.
7. The testing system 424 monitors the IN 408 for signaling pertinent to call continuation and terminal B alerts.
8. The testing system 424 stimulates terminal B to answer.
9. The originating MSC 406 sends an oAnswer event to the IN 408 at 416. (IN begins timing the call at this point for rating purposes.)
10. The testing system 424 monitors the IN 408 for signaling pertinent to the call answer.
11. The testing system 424 waits for 30 seconds.
12. The testing system 424 stimulates terminal A to end the call.
13. The IN 408 is notified with a oDisconnect event.
14. The testing system 424 monitors the IN 408 for signaling pertinent to the call end.
15. The IN 408 sends a short message to terminal A at 502 and 422.
16. The testing system 424 monitors the IN 408 for signaling pertinent to the short message.
17. The testing system 424 determines scenario success/failure.

In this scenario from the IN perspective, the stimulus information 606 and response information 608 includes information about the signals between the network elements (e.g., messages, initial detection point (IDP), connect to resource (CTR), short message service (SMS)). The scenario in FIG. 4 was from a black box perspective, where the stimulus information 426 and response information 428 included information about the subscriber balance. The scenario in FIG. 5 was from the end user perspective, where stimulus and response information 506 included information about a short text message. The testing language allows testing from the black box, end user, or network perspective, or any combination thereof.

Exemplary Automation Scenarios

One exemplary embodiment of the testing system supports the following IN automation scenarios for the following services: SurePay, eVPN, MiRing, and short message service center (SMSC) service.

IN MO voice call to short code: This scenario enables the service provider to automatically verify the functionality provided by the IN service when the end user dials a system defined short code for feature access (i.e., menu access, balance enquiry, call history, recharge, etc.).

IN MO voice call to auto-answering landline (i.e., voicemail): This scenario enables the service provider to automatically verify the functionality provided by the IN service when the end user dials a landline. The destination landline has voicemail ability to auto answer the call so that the scenario can be verified.

IN MO SM: This scenario enables the service provider to automatically verify the functionality provided by the IN service when the end user originates a short message to a destination.

IN MO voice call to non-IN mobile: This scenario enables the service provider to automatically verify the functionality provided by the IN service when the end user originates a voice all to a non-IN mobile. In addition, the testing system can answer this type of call, thus providing end-to-end functionality verification.

IN MO voice call to IN mobile residing on different MAS: This scenario enables the service provider to automatically verify the functionality provided by the IN service when the end user originates a voice all to an IN mobile that resides on a different MAS than the originator. In addition, the testing system can answer the terminating leg of the call.

IN MO call to short code (no voice path established): This scenario enables the service provider to automatically verify the functionality provided by the IN service when the end user dials a system defined short code for feature access that does not result in voice path setup (i.e., short code access that results in SMS to the user).

IN MT voice call (call originated by non-IN mobile): This scenario enables the service provider to automatically verify the functionality provided by the IN service when the end user receives a terminating voice call from a non-IN mobile. In addition, the testing system can originate and answer this type of call, thus providing end-to-end functionality verification.

IN MT voice call (call originated by IN mobile residing on different MAS): This scenario enables the service provider to automatically verify the functionality provided by the IN service when the end user receives a terminating voice call from an IN mobile residing on a different MAS. In addition, the testing system can originate and answer this type of call provided the handset is of the supported type, thus providing end-to-end functionality verification.

IN MO USSD call: This scenario enables the service provider to verify the functionality provided by the IN service automatically when the end user dials a system defined short code for feature access (i.e., menu access, balance enquiry, call history, recharge, etc.) and set various call forward features.

IN MO IVR Call: This scenario enables the service provider to automatically verify the functionality provided by an IVR/menu based application by providing the ability to send dual-tone multi-frequency (DTMF) tones.

IMOM OA&M Commands: This functionality enables the service provider to manipulate the service by executing input message output message functionality.

IN enhanced control server (eSM) Gateway: This enables the service provider to automatically verify the functionality provided by the eSM Gateway product.

Service/Subscriber Data Manipulation: This functionality enables the service provider to manipulate service and subscriber data pre scenario execution to precisely mimic the test environment and conditions, thus verifying the exact scenario.

Powerful Automation Scripting Language: This functionality enables the service provider to script precise expected call scenarios, supporting powerful features including: on-line DB queries, USLI command execution, shell command execution, real-time variables, intra call lightweight directory access protocol (LDAP) execution, and scope for "fuzzy"/"asynchronous" behavior.

In general, most of the scenarios outlined above are technology independent. However, some of the scenarios are supported only for specific technologies (e.g., CDMA vs. GSM), as illustrated in the following table.

TABLE 1

Region/Technology Specific Automation Scenarios

| Feature Name | Supported in GSM Market? | Supported in CDMA Market? |
|---|---|---|
| IN MO Voice Call to Short Code | Yes | Yes |
| IN MO Voice Call to Auto-Answering Landline (i.e., voicemail) | Yes | Yes |
| IN MO SM | Yes | Yes |
| IN MO Voice Call to Non-IN Mobile | Yes | Yes |
| IN MO Voice Call to IN Mobile Residing on Different MAS | Yes | Yes |
| IN MO Call to Short Code (No Voice Path Established) | Yes | Yes |
| IN MT Voice Call (Cal Originated by Non-IN Mobile) | Yes | Yes |
| IN MT Voice Call (Call Originated by IN Mobile Residing on Different MAS) | Yes | Yes |
| IN MO USSD Call | Yes | No |
| IN eSM Gateway | Yes | No |
| Service/Subscriber Data Manipulation | Yes | Yes |
| Powerful Automation Scripting Language | Yes | Yes |
| IN MO IVR Call | Yes | Yes |
| IMOM OA&M Commands | Yes | Yes |

Error & Report Logging

Exemplary embodiments of the testing system support extensive color visual aids within the reporting and error logging mechanisms, including the following features: easy construction and debugging of automation scripts, test progress indicators, and test success or failure indicators.

Batch Script Execution

Exemplary embodiments of the testing system support unattended execution of batched automation scripts, collating the resulting information, such as individual test traces or logs and test result summary.

Platform Configuration

On exemplary embodiment of the testing system includes software applications that may be configured to operate in the following system: a PC having a keyboard, monitor and mouse, CPU, RAM, hard drive, bootable CD ROM drive, floppy drive, LAN card, internal hardware modem card, PCI motherboard with at least two free PCI slots, two Q-TEC 112P serial expansion cards, the RedHat LINUX operating system, up to four GSM Nokia 30 units (GSM Market), up to four multitech CDMA units (CDMA market), and communication cables for each unit. Optionally, specific scripts to automate and verify call scenarios are provided. Facilities to generate scripts are provided.

In one embodiment, testing system, calls are initiated to perform end user scenarios using physical handsets. Therefore, call volume is restricted to one call scenario in progress on the MAS at any one time. Multiple handsets can be connected to the testing system to allow varying network scenarios with specific characteristics (i.e., roaming or non-roaming). Other embodiments may allow more than one call scenario at a time.

Exemplary embodiments of the testing system enable a service provider to reduce testing intervals while ensuring full regression quality of various aspects of service deliveries with network independence. The testing system provides the ability to remotely execute various scenarios from a mobile handset/terminal independent device and/or stimulate external network elements to satisfy a variety of provider scenarios, while not being tied to a particular network infrastructure or architecture.

Exemplary embodiments of the testing system automate the process of application independent event generation, specify associated deterministic response criteria and continue with further stimulus actions, which enables the testing system to satisfy testing criteria for numerous functional aspects of any service or network. This approach ensures reduced delivery times and cost, without sacrificing quality with full reusability.

Advantages

Exemplary embodiments of the present invention have many advantages. It is a real environment, not a message simulation. There is automatic execution of test cases. The testing environment is automatically established for provisioning subscriber data and service data modifications. There is automated trace authentication, including: correct signaling message flow and content (i.e., announcement IDs), subscriber post-condition, any appropriate fields (balance, etc.), AMA record generation and content, and traces collected for library purposes and human checks. There is batch mode for unattended overnight test runs, including log entry for individual test status and a summary report.

Typically, there are many repetitive steps for each test case: always pre-test subscriber data setup; occasionally pre-test service data modifications (multiple tables); documented test plan instructions for execution; collect debug log, check content according to document; check post-test subscriber status; and collect, check AMA record (multiple records, multiple individual fields). Each step takes some time. A simple example is 10 minutes per step, yielding 60 minutes per test, 8 tests per 8-hour day, and approximately 100 tests in 13 man-days for the first run.

For the analysis part of the general testing process, all steps are conducted by humans. This has advantages, because humans are intelligent, have experience, apply intuition, and have control over how the test is executed and varied. However, it also has limitations, because humans have different levels of experience yielding different execution speeds, humans can make mistakes causing re-execution and quality issues, humans are not free to apply intelligence and experience to every test; there is a time constraint because humans need sleep; test coverage is never 100% due to time constraints, which is a quality risk. These limitations are removed with exemplary embodiments of the present invention.

Profile Requirements/Regression Testing

One exemplary embodiment of the testing system includes an overnight method, a segmentation method, and a sanity check method. The overnight method selects batch of regression tests to execute, kicks off overnight batch run (zero human involvement), checks summary results the next day, and proceeds as appropriate, repeating on subsequent nights in parallel with normal test execution. Without the testing system, the regression tests would not have been executed. The segmentation method enhances human testing. Use the testing system to execute repetitive, simple automated tests. Humans are free to focus their intelligence and experience on variant tests. Thus, human testing is concentrated rather than random. For the sanity check method, regularly submit overnight batches for live network checks and regular health checks.

Benefits

Exemplary embodiments of the testing system have the potential to greatly enhance the current process by the choice of ways to implement and maximizing every hour of the night, which are otherwise unused. The customer is in full control of the process or method and can decide whether to do more regression testing, concentrated human testing, health checks, 24×7 test execution, or all of the above. The testing system reduces human errors that would otherwise be undetected, improving quality assurance, and introduces assured re-execution. Exemplary embodiments provide a degree of customization and personalization that was previously not possible. Prior work did not provide for stimulus-response and black-box methodologies network wide, allowing convergence and migration to next generation networks. These limitations are overcome with exemplary embodiments of the present invention.

Figure 7:
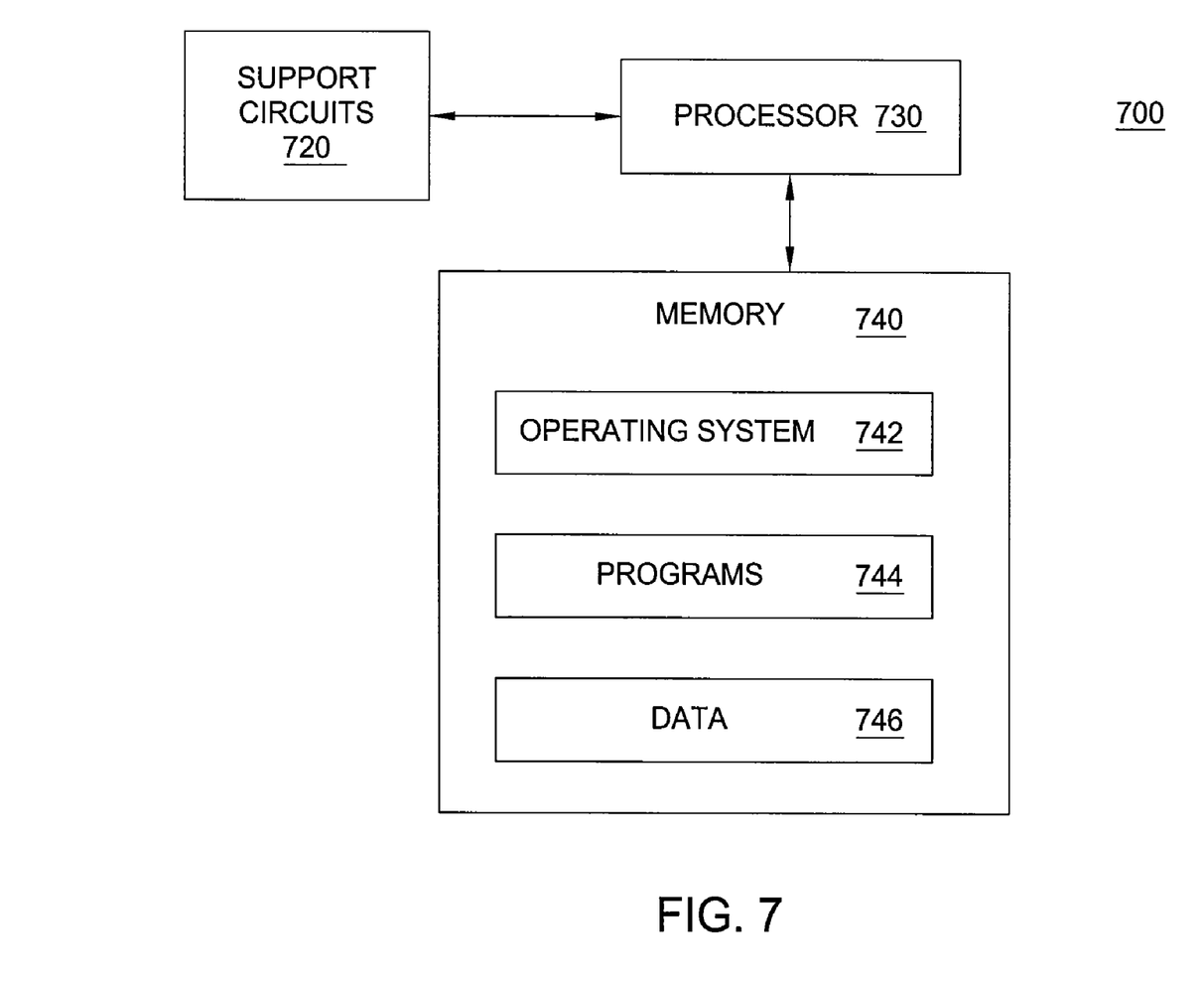
FIG. 7 is a high-level block diagram showing a computer.

FIG. 7 is a high-level block diagram showing a computer. The computer 700 may be employed to implement embodiments of the present invention. The computer 700 comprises a processor 730 as well as memory 740 for storing various programs 744 and data 746. The memory 740 may also store an operating system 742 supporting the programs 744.

The processor 730 cooperates with conventional support circuitry such as power supplies, clock circuits, cache memory, and the like as well as circuits that assist in executing the software routines stored in the memory 740. As such, it is contemplated that some of the steps discussed herein as software methods may be implemented within hardware, for example, as circuitry that cooperates with the processor 730 to perform various method steps. The computer 700 also contains input/output (I/O) circuitry that forms an interface between the various functional elements communicating with the computer 700.

One exemplary embodiment of the testing system is a configurable, scalable system that utilizes best in class, low cost, standard, available hardware, and operating system platforms. The system comprises server software that operates on a RedHat LINUX platform (provided by the customer) and communicates with standard GSM Nokia 30 and CDMA multitech units (provided by the customer) to drive call scenarios. Client software (which also executes under RedHat) communicates with the server and the MAS via TCP/IP and provides an interactive user application programmable interface (API) and a scripting mechanism for providing automated call stimulus and response verification. Operating under LINUX allows a user to use standard operating system functions to maintain libraries of call scenario verification scripts, schedule execution of test scenarios, and log results, among other things.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal-bearing medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A system for automated testing, the system comprising:
a plurality of architectural layers, each layer associated with a specific automated testing service allowing separation at key architectural points to thereby abstract away from a specific testing context, the system further comprises:
a platform configured to communicate with terminals of different types; and
a server communicatively coupled to the platform, wherein:
the server stores a plurality of dynamic configurations, each dynamic configuration associated with a particular type of terminal;
the server is configured to support automated testing services for one or more remote clients in communication with the server, wherein each of the automated testing services is defined by a respective plurality of generic commands; and
the platform is further configured, for each of the different types of the terminals:
to translate, for one or more of the automated testing services, each respective plurality of generic commands into a corresponding plurality of terminal actions, using a respective dynamic configuration associated with the type, the plurality of terminal actions adapted to the terminal type to stimulate terminals of the terminal type.

2. The system of claim 1, wherein the plurality of generic commands for at least one of the automated testing services is defined using an application independent stimulus and response rules language, the language adapted to define sets of abstract stimulus actions and respective sets of abstract response actions for expected results of abstract stimulus actions.

3. The system of claim 2, wherein the expected results of abstract stimulus actions comprise one or more of expected direct results of abstract stimulus actions and expected side effects of abstract stimulus actions.

4. The system of claim 1, wherein generic commands are one or more of terminal-independent and environment-independent.

5. The system of claim 1, wherein at least one of the automated testing services comprises one of stimulus-response testing and black box testing.

6. The system of claim 1, wherein the plurality of generic commands defining at least one of the automated testing services has been determined by a remote client of the one or more remote clients and provided to the server.

7. The system of claim 1, wherein the terminals comprise wireless devices and external network elements involved in processing of events associated with the wireless devices, wherein the plurality of generic commands defining at least one of the automated services comprises commands defining a sets of abstract stimulus actions associated with one of the wireless devices and a set of abstract response actions for expected results of the abstract stimulus actions, the expected results associated with one or more of the external network elements.

8. A method for providing automated testing, the method comprising:
separating at key architectural points a plurality of architectural layers, each layer associated with a specific automated testing service, thereby abstracting away from a specific testing context, the method further comprises:

receiving, at a server, a plurality of generic commands defining an automated testing service for a terminal, wherein each of the plurality of generic commands is terminal-independent;

using a dynamic configuration associated with a type of the terminal to translate the plurality of generic commands into a respective plurality of terminal commands adapted to the type of the terminal; and propagating at least one of the plurality of terminal commands toward the terminal for stimulating the terminal.

9. The method of claim 8, wherein the plurality of generic commands is defined using an application independent stimulus and response rules language, the language adapted to define sets of abstract stimulus actions and respective sets of abstract response actions for expected results of abstract stimulus actions.

10. The method of claim 9, wherein the expected results of abstract stimulus actions comprise one or more of expected direct results of abstract stimulus actions and expected side effects of abstract stimulus actions.

11. The method of claim 8, wherein the automated testing service comprises one of stimulus-response testing and black-box testing.

12. The method of claim 8, wherein each of the plurality of generic commands is environment-independent.

13. The method of claim 8, further comprising:
propagating each of the plurality of terminal commands toward the terminal for stimulating the terminal; and
determining success or failure of the automated testing service for the terminal.

14. The method of claim 13, further comprising:
providing, toward a remote client device associated with the automated testing service, information indicating the success or failure and data associated with performing of the automated testing service.

15. A computer-readable storage medium storing instructions for performing a method for providing automated testing, the method comprising:
separating at key architectural points a plurality of architectural layers, each layer associated with a specific automated testing service, thereby abstracting away from a specific testing context, the method further comprises:

receiving, at a server, a plurality of generic commands defining an automated testing for a terminal, wherein each of the plurality of generic commands is terminal-independent;

using a dynamic configuration associated with a type of the terminal to translate the plurality of generic commands into a respective plurality of terminal commands adapted to the type of the terminal; and propagating at least one of the plurality of terminal commands toward the terminal for stimulating the terminal.

16. The computer-readable storage medium of claim 15, wherein the plurality of generic commands is defined using an application independent stimulus and response rules language, the language adapted to define sets of abstract stimulus actions and respective sets of abstract response actions for expected results of abstract stimulus actions.

17. The computer-readable storage medium of claim 15, wherein the expected results of abstract stimulus actions comprise one or more of expected direct results of abstract stimulus actions and expected side effects of abstract stimulus actions.

18. The computer-readable storage medium of claim 15, wherein the automated testing service comprises one of stimulus-response testing and black-box testing.

19. The computer-readable storage medium of claim 15, wherein the method further comprises:
propagating each of the plurality of terminal commands toward the terminal for stimulating the terminal; and
determining success or failure of the automated testing service for the terminal.

20. The computer-readable storage medium of claim 19, wherein the method further comprises:
providing, toward a remote client device associated with the automated testing service, information indicating the success or failure and data associated with performing of the automated testing service.

* * * * *